(12) United States Patent
Bek

(10) Patent No.: US 11,747,119 B2
(45) Date of Patent: Sep. 5, 2023

(54) HARPOON TIP OF UNDERWATER WEAPON

(71) Applicant: Osaühing Eurad, Tallinn (EE)

(72) Inventor: Alexander Bek, Otepää (EE)

(73) Assignee: Osaühing Eurad, Tallinn (EE)

( * ) Notice: Subject to any disclaimer, the term of this patent is extended or adjusted under 35 U.S.C. 154(b) by 0 days.

(21) Appl. No.: 17/857,655

(22) Filed: Jul. 5, 2022

(65) Prior Publication Data

US 2023/0009833 A1 Jan. 12, 2023

(30) Foreign Application Priority Data

Jul. 6, 2021 (EP) .................................... 21020353

(51) Int. Cl.
*A01K 81/04* (2006.01)
*F42B 6/08* (2006.01)

(52) U.S. Cl.
CPC ................ *F42B 6/08* (2013.01); *A01K 81/04* (2013.01)

(58) Field of Classification Search
CPC ... A01K 81/04; F42B 6/02; F42B 6/04; F42B 6/08
See application file for complete search history.

(56) References Cited

U.S. PATENT DOCUMENTS

| 4,043,067 | A | * | 8/1977 | Konucik | A01K 81/04 43/6 |
| 4,642,929 | A | * | 2/1987 | Franklin | F42B 6/08 43/6 |
| 4,839,979 | A | * | 6/1989 | Rogers | A01K 81/04 43/6 |
| 6,027,421 | A | * | 2/2000 | Adams, Jr. | F42B 6/08 473/578 |
| 8,016,703 | B1 | * | 9/2011 | Kronengold | F42B 6/08 473/582 |
| 8,337,341 | B1 | | 12/2012 | Huang | |
| 9,341,447 | B2 | * | 5/2016 | James | F42B 6/08 |
| 2009/0064888 | A1 | | 3/2009 | Polovnev et al. | |

FOREIGN PATENT DOCUMENTS

| DE | 20 2011 001745 U1 | 4/2011 |
| DE | 10 2010 023089 A1 | 2/2012 |
| RU | 27694 U1 | 2/2003 |
| WO | 2014077727 A1 | 5/2014 |

OTHER PUBLICATIONS

European Application No. 21020353.5, Extended European Search Report, dated Dec. 13, 2021, 5 pages.

* cited by examiner

*Primary Examiner* — John A Ricci
(74) *Attorney, Agent, or Firm* — Meunier Carlin & Curfman LLC

(57) ABSTRACT

The harpoon tip of underwater weapon comprises a tip body with a threaded or other mounting system as well as one or more means for prey fixation. A striker is mounted on the tip body which has sharp peaks located at both ends of the striker, it is possible to flip the striker inside the body 180 degrees during hunting. The striker is made of a extremely strong hard alloy, substantially of tungsten carbide, titanium carbide or their combination, and the tip body is made of a heavy tungsten-based alloy.

5 Claims, 1 Drawing Sheet

HARPOON TIP OF UNDERWATER WEAPON

PRIORITY

This application claims priority of European Patent Application No. 21020353.5 filed on Jul. 6, 2021.

TECHNICAL FIELD

The invention relates to weapons for underwater hunting, in particular, to the harpoon tips of underwater weapon (spearfishing rifles).

BACKGROUND OF THE INVENTION

Among known products, there is Pelengas tip (https://pelengas-shop.com/nakonechniki-ru/nakonechnik-s-dvumya-lepestkam i-so-skruchivayushhimisya-nasadkami-ru) for hunting in water bodies with a rocky bottom. The tip comprises a tip body, in the front part of which there is a peak of the tip and there are flags fixed to the tip body. The peak of the tip is made of durable steel (based on construction dowel), the material of the other tip parts is stainless steel (tip body is made of stainless steel EN1.4125). This solution has disadvantages: the peak is prone to rust, the peak is not sharp enough and is easily additionally blunted when it hits hard objects and therefore it does not penetrate the scales of large fish at a long distance well enough.

Among known products, there is a harpoon tip (WO2014077727, Voronovsky A. V. published on 22 May 2014), which comprises a tip body connected with striking part coaxially by a detachable or non-removable connection. One or two folding flags are installed in the central part of the body. A coaxial threaded channel is made in the rear part of the body. The striking part is made in the form of a cone or a polyhedral pyramid with a base corresponding to the body and is equipped with a dagger-type blade with a double-edged sharpening. Insufficient strength and hardness of the peak of the front striking part, made of the stainless-steel tip, is a significant disadvantage of this tip, which results in a rapid blunting of the striking part when the harpoon hits solid underwater obstacles as well as a sharp drop in the harpoon effectiveness. Moreover, it is difficult and takes a lot of time to sharpen the tip with a blunted or broken-off peak right on the shore.

Among known products, there is a harpoon for underwater weapon (RU27694, Kuznetsov M. D., published on 10 Feb. 2003), comprising a hollow stainless-steel body, equipped with a shank and a tip. A filler made of tungsten or its alloy is placed inside the hollow steel body. A shank is mounted in the tail part of the harpoon body by means of a threaded connection. There is also a tip with a peak fixed in the front part of the harpoon body by means of a threaded connection. A filler made of tungsten or its alloy is placed in the cavity of the steel body to increase the harpoon's force by increasing its mass and to increase the straightness of the arrow's flight. There are the following disadvantages of this solution: the relative manufacturing complexity, the low strength of the harpoon in the area of threaded connections when using a thin-walled tube or a low volume of filler when using a thick-walled tube. The location of the harpoon center of gravity is in the middle, which results in a significant deviation of the arrow flight path in case of body bending or in places of threaded connections, which are always present.

SUMMARY OF INVENTION

The purpose of the invention is to manufacture a harpoon tip that increases the range of the arrow and is not blunted easily.

This purpose is achieved by the represented harpoon tip of underwater weapon, which comprises a tip body attached to the harpoon by a threaded or other connection, a striker sharpened at both ends, attached by a streamlined head in the front part of the tip body, one or more means for fixing the prey on the harpoon. The tip body has a hole, wherein the diameter of the hole is smaller than the diameter of the striker. The striker is installed and held along the tip body axis by the head and rests against the tip body along the hole edge, but the peak of the striker is located freely in the hole. The striker can be turned (flipped) inside the body 180 degrees during hunting. The tip body is made of a heavy tungsten-based alloy, wherein the tungsten alloy comprises tungsten (70-98%), nickel and/or iron and/or copper (2-30% in total) and possibly additives of cobalt and/or molybdenum and/or vanadium and/or rhenium (0.1-5% in total). The striker is made of a durable hard alloy, which comprises 70-98% tungsten carbide or titanium carbide or their combination as a solid phase, possibly with additives tantalum carbide and 2-30% cobalt or nickel and molybdenum or their combination as a binder.

DETAILED DESCRIPTION OF THE INVENTION

Figure 1:
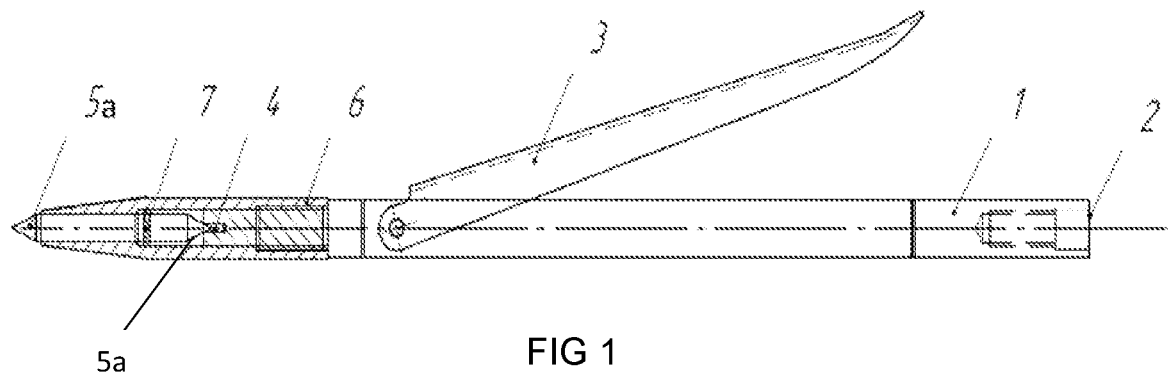
FIG. 1 illustrates the tip of a harpoon in accordance with the presented invention.
Figure 2:
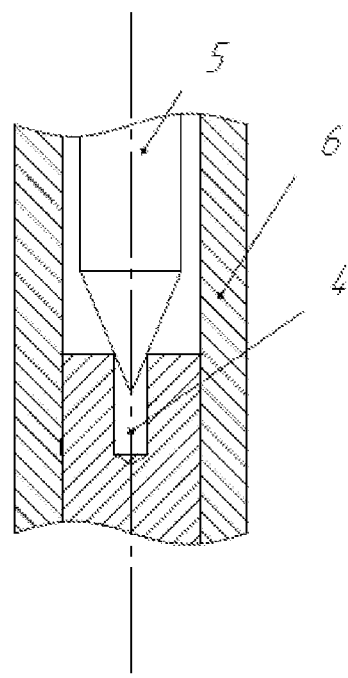
FIG. 2 shows one of peaks of the striker, located in the hole.

The presented harpoon tip comprises the tip body 1, which is fixed to the harpoon 2, the means 3 (flags) for fixing prey on the harpoon, the hole 4 under the striker 5 in the head 6, the ring 7.

The tip body 1 is fixed with a threaded or other attachment system to the harpoon 2 from the back side. Means 3 of fixing the prey on the harpoon are fixed to the body and serve as prey fixators. The head 6 with a hole 4 comprises a striker 5 with a ring 7. The striker 5 is mounted on the tip body 1 with the head 6. The striker 5 is installed and held along the axis of the tip with the head 6 and rests against the tip body along the edge of the hole 4, and the peak 5a of the striker 5 is located freely in the hole 4. The striker 5, which has sharpened peaks 5a at both ends, is an element of the tip that can be turned (flipped) 180 degrees inside the body during underwater hunting (spearfishing). The striker 5 is made of a particularly strong hard alloy based on tungsten carbide or other carbides or nitrides. The streamlined head 6 with a hole 4 through which the striker 5 passes is screwed or attached to the tip body 1 and fixes the striker 5 in a position along the axis of the tip. In order for one of the two sharpened peaks of the striker 5 on the back side not to become blunt when the harpoon hits solid objects, the hole 4 of a smaller diameter than the diameter of the striker 5 is made in the front end of the tip body.

The depth of the hole 4 is selected in such a way that the striker 5 rests against the tip body along the edge of the hole 4, and the peak 5a of the striker 5 is located freely in the hole, so that the sharp point obviously is not reaching the bottom of the hole 4.

In order to prevent spontaneous loss of the striker 5 from the head 6, a ring 7 made of rubber, plastic or one or more turns made of thin stainless-steel spring is placed on the striker 5.

The tip body 1 is made of a heavy tungsten-based alloy, comprising of tungsten (70-98%), nickel and/or iron and/or copper (2-30% in total), possibly with additions of cobalt and/or molybdenum and/or vanadium and/or rhenium (0.1-5% in total), and this alloy can be machined.

If the front part of the striker is blunted or broken, it can be turned forward (flipped) with the rear sharp part without using a special tool. In order to do this, it is enough to screw the head 6, shake out or push out with a match, toothpick or other improvised means from the head 6 towards its wider part of the striker 5, turn (flipping) the striker 180 degrees with the sharp side forward, insert it into the head 6 and screw the head 6 back onto the tip body.

This invention provides an increase in the flight distance of the arrow, an increase in the distance of fish injury, an increase in the aiming and straightness of the arrow flight, an increase in the stability of the tip during hitting solid objects, the possibility of re-using the same tip in case of damage or when the peak is blunted without sharpening operations by turning (flipping) the striker 180 degrees right at the hunting place (it is more convenient to do it on the shore).

The presented invention has a number of advantages:
such a tip with a hard alloy striker withstands most of the impacts on underwater obstacles without blunting;
the striker penetrates the scales and the body of fish more reliably due to maintaining a very sharp peak for a longer hunting time;
in case of hitting a hard stone at close distance and blunting or breaking the striker, the striker can easily be turned (flipped) over by the other side (which is still sharp) right on the shore during underwater hunting (spearfishing) without using special tools;
the hunter does not need spare arrowheads or arrows in case of blunting the striking part of the harpoon tip, which is significantly cheaper and requires less space and weighs less than spare arrowheads and (or) arrows;
the production of a striker from a particularly durable material in the form of a cylinder with a length of one or several centimeters and a diameter of several millimeters is technologically more simple and inexpensive.

There are the following advantages of manufacturing the tip body from a heavy tungsten-based alloy:
such a tip increases the distance for any used harpoon;
such a tip increases the straightness of the flight of any used harpoon, reduces the deviation of such a harpoon when moving in water due to its possible curvature by shifting the center of gravity to the front end of the harpoon;
such a tip can be used with a wide range of standard harpoons.

What is claimed is:

1. A harpoon tip of an underwater weapon, configured to be attached to a harpoon, the harpoon tip comprising:
   a tip body made of heavy tungsten-based alloy and having a head with a hole;
   a striker made of durable hard alloy based on tungsten or titanium carbide or their combination, and having a first and a second sharp peak at a first and a second end of the striker, respectively, and resting against the tip body along an edge of the hole;
   a ring placed around the striker; and wherein
   the striker is mounted in the tip body such that the striker rests along an edge of the hole and one of the first or the second sharp peaks of the striker freely located in the hole, and the striker is capable of being flipped 180 degrees such that another of the first or second sharp peaks locate in the hole.

2. The harpoon tip of underwater weapon according to claim 1, wherein the tip body is made of tungsten alloy that comprises tungsten (70-98%), nickel and/or iron and/or copper (2-30% in total) and optionally additives of cobalt and/or molybdenum and/or vanadium and/or rhenium (0.1-5% in total).

3. The harpoon tip of underwater weapon according to claim 1, wherein the striker is made of alloy that comprises 70-98% tungsten carbide or titanium carbide or their combination as a solid phase, optionally with additives of tantalum carbide and 2-30% cobalt or nickel and molybdenum or their combination as a binder.

4. The harpoon tip of underwater weapon according to claim 1, wherein the hole is in a front end of the tip body, and the diameter of the hole is smaller than the diameter of the striker.

5. A harpoon comprising the harpoon tip of claim 1.

* * * * *